United States Patent [19]

Fujita

[11] Patent Number: 5,047,255
[45] Date of Patent: Sep. 10, 1991

[54] ACTIVATING MATERIAL COMPOSED MAINLY OF ANIMAL BONE, FLOCCULATING AGENT COMPOSED MAINLY OF THE MATERIAL AND PROCESSES FOR PREPARATION THEREOF

[76] Inventor: Sanai Fujita, No. 2256-13 Kitatokorozawa-cho, Tokorozawa-shi, Saitama-ken, Japan

[21] Appl. No.: 276,265

[22] Filed: Nov. 25, 1988

[30] Foreign Application Priority Data

Apr. 28, 1988 [JP] Japan .................. 63-105579
Apr. 28, 1988 [JP] Japan .................. 63-105580

[51] Int. Cl.$^5$ .................................. C04B 33/32
[52] U.S. Cl. .................................. 426/418; 426/419; 426/486; 426/124; 426/324; 501/142; 127/55; 502/64; 502/84
[58] Field of Search ................ 501/142, 1; 127/55; 426/267, 74, 97, 323, 654, 418, 419, 486, 124; 502/64, 84

[56] References Cited

U.S. PATENT DOCUMENTS

| 239,393 | 3/1881 | Logan | 501/142 |
|---|---|---|---|
| 2,071,452 | 8/1935 | Bloch | 106/71 |
| 2,209,069 | 10/1938 | Bodenheim et al. | 127/55 |
| 2,352,932 | 7/1944 | Barrett et al. | 252/265 |
| 4,171,342 | 10/1979 | Hirko et al. | 423/160 |
| 4,219,360 | 8/1980 | Thompson | 106/45 |
| 4,274,879 | 6/1981 | Irvine | 106/39.5 |

FOREIGN PATENT DOCUMENTS

| 0033243 | 1/1981 | European Pat. Off. | 501/142 |
|---|---|---|---|
| 53-51218 | 5/1978 | Japan | 501/142 |
| 58-15016 | 1/1983 | Japan | |

OTHER PUBLICATIONS

Charier-Vadrot, "Preparing Gelatin and Analagous Materials for Preserved Foods from Collagenous Substances", 1970-FR95139, Jul. 24, 1970. (Abstract)

Primary Examiner—William R. Dixon, Jr.
Assistant Examiner—Alan Wright
Attorney, Agent, or Firm—Nils H. Ljungman & Associates

[57] ABSTRACT

A first activating material with pores having alkali-ionization promoting function and a process for the preparation thereof, the material comprises animal bone material which is calcined so that the water content is below several wt. percent and is pulverized or powdered into a chipped, granular or powdery state. A second activating material and a process for the preparation thereof, the second activating material comprises the first activating material as well as a magnetic clay powder, both being kneaded, solidified and calcined. A first flocculating agent comprises a solution of the first activating material in sulfuric acid or hydrochloric acid. A second flocculating agent and a process for the preparation of the second flocculating agent which comprises a homogeneous composition comprising the second flocculating agent and a metal solution of a mixture of copper with iron or zinc in sulfuric acid or hydrochloric acid.

24 Claims, 4 Drawing Sheets

ACTIVATING MATERIAL COMPOSED MAINLY OF ANIMAL BONE, FLOCCULATING AGENT COMPOSED MAINLY OF THE MATERIAL AND PROCESSES FOR PREPARATION THEREOF

BACKGROUND OF THE INVENTION

1. Field of the Invention

The present invention relates to a pulverized or powdered animal bone and processes for the preparation thereof. More particularly, the present invention relates to an activating material exerting functions of preventing putrefaction of organic substances, maintaining freshness in foods, and filtering and cleaning waste water or air by utilizing fine pores and alkali ionization-promoting properties of an animal bone, to a flocculating agent for flocculating and separating organic substances or surface active agents contained in waste water and also to processes for the preparation thereof.

2. Description of the Prior Art

Various additives such as preservative agents for inhibiting the growth of micro-organisms and anti-oxidants for preventing deterioration by oxidation have been used for maintaining freshness in foods and attaining a preservative effect. For example, as the preservative agent, there can be mentioned food additives such as not only benzoic acid, sorbic acid and propionic acid but also a sheet or bag formed by sandwiching a powder of active carbon having a fungicidal action to bacteria with a synthetic resin film, paper or woven sheet and a paper impregnated with water containing active carbon. As the anti-oxidant, there can be mentioned food additives such as not only ascorbic acid and erysorbic acid but also a bag having an active carbon powder sealed therein. Active carbon having an adsorbing action, tertiary iron oxide and ceramics are used for filtering and deodorizing an aqueous solution and air containing impurities and organic substances.

As the flocculating agent for flocculating organic substances and the like contained in waste water, there can be mentioned alumina sulfate, poly(aluminum chloride) and ferric chloride.

The activated sludge process has been mainly adopted for the treatment of waste water containing organic substances. According to the activated sludge process, micro-organisms such as bacteria are propagated, organic substances in the sludge are adsorbed in the micro-organisms and the impurities are sedimented and separated, and this process exerts a very high purifying capacity. Treated water according to the activated sludge process is directly discharged into rivers and the like in the state satisfying a certain water quality regulation.

The above-mentioned additives have an effect of preserving foods, but they have a risk of jeopardizing the safety of the human body and some additives have harmful actions such as carcinogenic and tetratogenic actions. Active carbon and a bag having active carbon sealed therein are poor in the preservative effect or oxidation-preventive effect.

Active carbon and tertiary iron oxide exert a filtering action as the adsorbent, but the life is short and regeneration after the application, or repeated use, is impossible. Since ceramics are inorganic substances, they do not react with organic substances. Accordingly, they do not function sufficiently as the filtering material.

In the conventional activated sludge process, if waste water containing corruptible organic substances such as animal oils is treated, the quality of treated water satisfies the standard value, but the quality of treated water is not so sufficient that treated water is completely harmless to a natural water zone, because the pH value is in the acidic region, each of BOD and COD is about 30 to about 80 ppm and the smell is not completely removed. Moreover, this treated water cannot be suitably used as industrial water or washing water. Moreover, if an activated sludge tank is maintained at a temperature of 20° to 30° C. suitable for propagation of micro-organisms, aeration is always necessary for supply of oxygen and other conditions should be set, and a long time is necessary for completion of the treatment and complicated equipment is necessary. Accordingly, the equipment cost is large, and a large maintenance fee and a great deal of labor are necessary.

As the means for obviating the above-mentioned disadvantage, there have been proposed various processes in which calcium phosphate derived from an animal bone powder is used as an active calcium agent or flocculating agent broadly in various fields for antiseptic and flavor-improving additives, acid neutralizers, dechlorinating agents for service water and flocculating agents for organic waste waters (see Japanese Patent Publications No. 53816/84 and No. 6365/81 and Japanese Patent Application Laid-Open Specifications No. 5309/81, No. 231965/86 and No. 4490/87). All of the above-mentioned documents are incorporated herein by reference as if the entire contents thereof were fully set forth herein.

According to these known processes, however, calcium phosphate additives are prepared only by calcining an animal bone to remove the majority of organic substances and carbon by combustion, or only by boiling or steaming an animal bone to remove the majority of organic substances and carbon. Accordingly, removal of carbon or sulfides is insufficient, and these processes are defective in that high-quality products cannot be obtained.

OBJECTS OF THE INVENTION

It is a primary object of the present invention to overcome the above-mentioned defects and provide an activating material composed of an animal bone, which prevents putrefaction of foods, has a sufficient freshness-preservative effect, is nontoxic to the human body, is suitable for ion exchange in water and air, removal of a smell by adsorption and purging of impurities including organic substances and can be used for a long time, and a process for the preparation thereof.

Another object of the present invention is to provide a flocculating agent which can react in a neutral or alkaline zone to prevent environmental pollution by discharge of treated water and has such a high reactivity that it reacts with tap or service water or comparable water, and which can exert a sufficient function with a very small amount used.

A still another object of the present invention is to provide an animal bone-containing flocculating agent especially suitable for a waste water treatment which is different from the conventional activated sludge process utilizing micro-organisms such as bacteria for separation of impurities contained in waste water, and in which conditions set are simplified, the equipment and maintenance are simplified, waste water, especially waste water containing corruptible organic substances derived from animals, is deodorized, sterilized and purified in a short time, and regenerated water having a quality comparable or superior to that of service water, not causing pollution even if it is discharged in a natural water zone and being suitable for reutilization in a broad region, is obtained.

SUMMARY OF THE INVENTION

In accordance with the present invention, there is provided a first activating material (alkali ionization-promoting material having fine pores), which comprises animal bone material which is calcined so that the water content is below several % and is pulverized or powdered into a chipped, granular or powdery state.

Furthermore, in accordance with the present invention, there is provided a first process for the preparation of the first activating material composed of an animal bone, which comprises sufficiently boiling a crude animal bone cut to an appropriate size at a temperature of about 200° to about 400° C., calcining the boiled bone at a temperature of about 900° to about 1100° C. so that the water content is below several %, cooling the bone to room temperature or a lower temperature, and chipping or pulverizing the bone to a granular or powdery state.

Moreover, in accordance with the present invention, there is provided a second activating material and a second process for the preparation of an animal bone-containing activating material, the second activating material comprising mixing an animal bone material prepared according to a first process with a calcined magnetic clay powder, adding water to the mixture, granulating the mixture to an appropriate shape, drying the granulated mixture and calcining the granulated mixture at a temperature of about 800° to 1100° C. so that the water content is below several %.

Still further, in accordance with the present invention, there is provided a flocculating agent and a third process thereof, the agent comprising a solution of a first animal bone material in sulfuric acid or hydrochloric acid.

Still further, in accordance with the present invention, there is provided a fourth process for the preparation of a flocculating agent comprising a solution of a bone animal, which comprises dissolving an animal bone material prepared according to the first process in sulfuric acid or hydrochloric acid to obtain an animal bone solution, separately dissolving a mixture of copper with iron or zinc in sulfuric acid or hydrochloric acid to obtain a metal solution and uniformly mixing both the solutions to form a homogeneous composition.

Still further, in accordance with the present invention, there is provided a fifth process for the preparation of a flocculating agent comprising a solution of an animal bone, which comprises dissolving an animal bone material prepared according to the first process in sulfuric acid or hydrochloric acid, the amount of the animal bone material being about 1 kg per about 1 to about 1.5 liters of the acid, adding water to the bone solution to dilute the bone solution, forming a metal solution by dissolving a mixture of copper with iron or zinc in sulfuric acid or hydrochloric acid, the amount of the metal mixture being about 100 g per about 1 to about 1.5 liters of the acid, adding water to the solution to dilute the solution and filtering the solution, and mixing the bone solution with the metal solution at a volume ratio of from 1/0.3 to 1/0.7 to form a homogeneous composition.

The present invention will now be described hereinafter in detail with reference to the accompanied drawings.

DESCRIPTION OF THE PREFERRED EMBODIMENTS (1) Activating Material (Animal Bone Material)

In the present invention, bones of animals which are mostly discarded from stock farms, especially bones of animals having mainly hard bones, such as bovine, equine and sheep, are used as the starting material. Bones of swine and boar consist mainly of soft bones and they are almost dissolved at the boiling step in the preparation process. Accordingly, bones of these animals often cannot be suitably used in the present invention.

Figure 1:
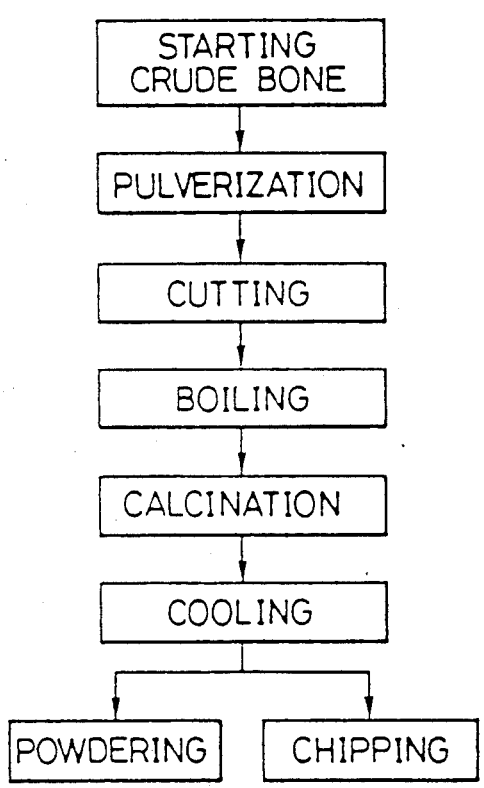
FIG. 1 is a flow chart showing a process for preparing a powdered or chipped animal bone according to the present invention.

Referring to the flow chart of FIG. 1, the crude animal bone is cut to an appropriate size appropriate for calcination such as preferably about 3 centimeters square and is charged into a pressure vessel (compression vessel), and the cut bone is boiled in water at about 200° to about 400° C. for about 90 minutes. The size of the bone may vary in size when cut within a centimeter or so. Then, the boiled bone is placed in a calcination furnace and calcined at about 900° to about 1100° C. for about 80 to 180 minutes, and the calcined bone is naturally cooled in the furnace for about 60 minutes to return the temperature to room temperature or a level close thereto.

If organic substances such as gelatin, fats, proteins and glue are left in the bone, oxidation and putrefaction are caused. It is important that these organic substances should be removed with a certainty. The majority of organic substances present not only on the outside of the bone but also in an infinite number of pores can be removed from the bone by this boiling operation. If the boiling operation is conducted for a shorter time at a lower temperature, the organic substances cannot be sufficiently removed and troubles are caused at the subsequent calcination step. Even if the boiling operation is conducted for a longer time at a higher temperature, no particular advantage is usually attained.

By removing the majority of organic substances at the boiling step and passing the bone through the above-mentioned calcination step, the residual organic substances can be almost completely removed, and simultaneously, the humidity (water content) in the bone can be reduced below several %, such as below 2–6%, and preferably below 1% to almost 0%. If calcination is carried out without the boiling operation, there may be combustion of organic substances and generation of smokes which are conspicuous, resulting in environmental pollution, worsening of working environment and damage of equipment.

If the calcination is carried out at a lower temperature for a shorter time, the bone is often carbonized, and if the calcination is carried out at a higher temperature for a longer time, the bone is usually changed to ashes. In each case, the intended function of the present invention cannot be exerted. If the calcination is carried out under the above-mentioned conditions, the bone is whitened and the original tissue having a large number of pores is maintained.

After the calcination, the calcined bone may be directly frozen and dried. However, in order to prevent increase of the humidity in the bone by rapid cooling and reduction of the pH value of the bone by the humidity, it is preferred that the calcined bone be naturally cooled and naturally dried by allowing self-cooling to ambient temperature either within or outside the calcination equipment. In this case, in order to maintain the dry state attained at the calcination step, it is preferred that the calcined bone be cooled to a temperature such as room temperature in the range of about 15° C. to about 30° C. while maintaining the atmosphere of the calcination chamber. If freeze-drying is carried out after normal temperature range is restored after the calcination, the physical properties of the bone material and the dry state can be further stabilized.

After the above-mentioned calcination and cooling operations, the bone is pulverized and is formed into a bone powder having a size of about 20 to about 200 mesh, preferably 50 to 100 mesh, by a powdering machine.

This powdering is preferred for forming the activating material of the present invention.

In case of a bovine bone, this powdered bone is obtained in a yield of 40% based on the weight of the starting crude bone. When 100 g of the bovine bone powder obtained according to the present invention was analyzed by the Japanese Association of Food Sanitation, the results shown in Table 1 were obtained. An infinite number of fine pores continuous to the outside and inside of particles of the bovine bone were present and gelatin, fats, proteins and glue adhering in an amount of about 47.4% to the pores were completely removed and the water content was very low (below 1%).

TABLE 1

| Calcium | 38,000 mg | atomic absorption spectroscopy |
|---|---|---|
| Phosphorus | 17,000 mg | molybdenum blue method |
| Iron | 50 mg | |
| Sodium | 930 mg | |
| Potassium | 49 mg | |
| Magnesium | 730 mg | atomic absorption spectroscopy |
| Arsenic (as $As_2O_3$) | not detected (detection limit: 0.1 ppm) | Godzeit method shown in Sanitary Test Methods compiled by Japanese Association of Pharmacy |
| Lead | not detected (detection limit: 0.5 ppm) | |
| Cadmium | not detected (detection limit: 0.1 ppm) | |
| Zinc | 50 ppm | |
| Barium | 1.2% | atomic absorption spectroscopy |

It is preferred that the bone powder be sealed and stored or frozen and stored. This is necessary for preventing intrusion and propagation of sundry germs in fine pores of the bone material. In the case where the bone material is used as the freshness-maintaining agent or the like for foods, it is preferred that this preservation method be adopted. If the bone material is used as the filtering material or the like in the fields other than the field of foods, this preservation method need not be adopted.

At the experiment of mixing the above-mentioned bone powder with cold tap water (ordinary service water), bubbling was caused mainly by the calcium ion, and the pH value was about 11 in the case of the granular material and 8 to 10 in the case of the powdery material. Moreover, the pH value in warm water was higher than in cold water. It is considered that this difference of the pH value may have been due to the humidity which may have been increased by adsorption of a small amount of water contained in air at the pulverization by a powdering machine in the case of the powdered bone.

If this bone material is used, ion exchange and alkalization of an atmosphere such as a liquid or air and neutralization of an acidic atmosphere are believed to be attained, whereby effects of preventing putrefaction of animals and vegetables, maintaining the freshness and sterilizing animals and vegetables are often attained. Moreover, by virtue of the presence of fine pores in the bone material, the function can be accomplished efficiently and continuously. If a liquid or gas is passed through a layer formed of the bone material, the purifying action including filtration is exerted, and calcium and other components are not harmful to the human body at all.

The above-mentioned bone material may be used, for example, for not only preventing putrefaction but also maintaining the freshness. A sheet formed by spraying the powdery bone of the present invention on one surface (the piled surface described hereinafter) of an air-permeable sheet composed preferably of a paper, a nonwoven fabric, a synthetic resin film or other appropriate material or by mixing the powdery bone into the starting material for formation of the above-mentioned air-permeable sheet and integrally molding the mixture can be used singly. However, if this sheet is piled (laminated) on an air-impermeable sheet to form a packaging sheet and an animal or vegetable food is wrapped with this packaging sheet so that the air-permeable sheet is located on the inner side, a calcium-ionized and alkalized atmosphere is maintained in the interior, oxidation is prevented and bacteria are sterilized, and high effects are attained for preventing putrefaction of the content and maintaining the freshness. These effects may be maintained for a long time in case of foods which are readily putrefied or deteriorated, such as fish and meat.

When the bone material of the present invention was mixed into water (preferably in a proportion of about 15 g of bone material to about one liter of water) and fish or the like (tuna was used at the experiment) was immersed in the mixture, taken out, wrapped with an ordinary film and stored in a household refrigerator, discoloration was not caused even after the passage of two weeks and no putrefaction smell was felt, and a slight putrefaction smell was felt only after about 20 days. Moreover, if a plant was immersed in water in which the alkalizing material of the present invention was incorporated, the plant grew little by little as in the rooted state and greenness and freshness tend to increase, and this effect is especially conspicuous in case of a fibrous plant such as a leek or a spring onion.

If a sheet formed by applying or incorporating the powder of the present invention to or in the above-mentioned manner or a package formed by wrapping the powder of the present invention with a bag formed of an air-permeable sheet is arranged in the bottom of a food tray or box, an alkalized atmosphere formed by the calcium ionization is maintained within the tray or box, and therefore, high effects are attained when the powder of the present invention is used in this manner. Especially, since gravy or other fluids issuing from fish, meat or the like is adsorbed and alkalized or neutralized, the gravy which is a substantial cause of putrefaction is rendered substantially uncorruptible or odorless.

If a sheet having a similar structure is used as a shoe insole, a deodorizing effect is exerted by the adsorbing action of an infinite number of fine pores and also by the alkalization of the atmosphere, and since this effect is not changed until the bone material is used up or becomes extinct, the deodorization is maintained over a period of a long time and dermatophytosis is prevented.

If the powder of the present invention is applied or incorporated to or in a filter composed of a urethane foam or the like, a liquid or gas is alkalized or neutralized from an acidic state by the calcium ion and purification is attained by the sterilizing action. Furthermore, when the chipped material of the present invention is used as a filtering material, weak alkalization (ionization) of service water, which is preferable for the human body, can be attained, and if air in a room is circulated through the filtering material of the present invention, purification by alkalization and sterilization can be attained and good effects can be exerted on the human body. Moreover, if waste water containing organic substances is passed through this filtering material, the waste water is purified through alkalization or neutralization. Still further, if the alkalizing material of the present invention is arranged in a cooling tower, a water heater of the solar heating system, generation of green algae is substantially reduced or prevented and simultaneously, putrefaction of water is generally prevented.

Since the calcined hard bone material has an infinite number of fine pores, if the bone material of the present invention used in the foregoing fields is washed, the adhering impurities are set free and the bone material can be used repeatedly for a long time.

Since the bone material of the present invention is derived from an animal bone, nutrients such as calcium are contained, and the bone material can be incorporated as an additive into a food and can act as a preservative agent or an anti-oxidant without a fear of the toxity possessed by conventional synthetic preservative agents and synthetic anti-oxidants.

Moreover, since the bone material of the present invention contains potassium, phosphorus and the like, if a sludge discharged from, for example, a stock farm is deodorized and dried and is then mixed with the bone material of the present invention, an organic fertilizer is provided because the deodorized and dried sludge is an organic material containing nitrogen, ammonium sulfate and ammonia. Furthermore, since the alkalizing material of the present invention has an infinite number of fine pores and is in the dry state, the alkalizing material keeps the soil soft while absorbing oxygen in the soil, and the alkalizing material preferably maintains an alkalizing atmosphere. These functions can be exerted until the bone material is used up or becomes extinct (typically scores of years). Accordingly, the bone material of the present invention is distinguishable over conventional lime or the like which is coagulated to solidify the soil, and the bone material of the present invention exerts a soil-improving action.

The bone material of the present invention can be used in various fields other than the above-mentioned fields.

(2) Activating Material (Mixture of Bone Material and Magnetic Clay)

Figure 2:
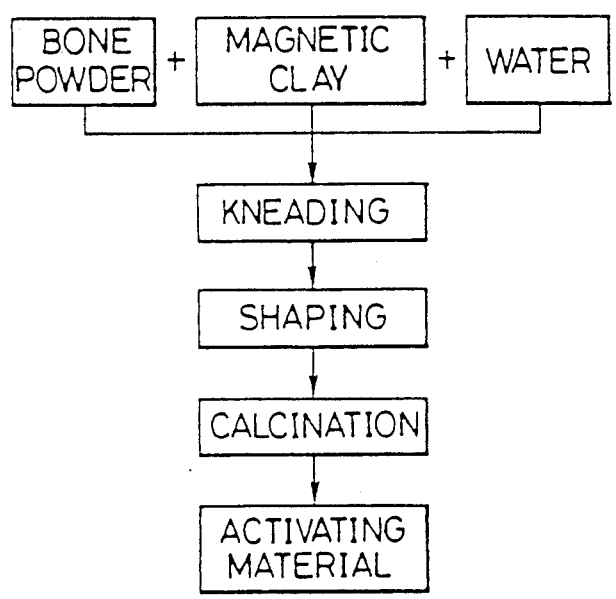
FIG. 2 is a flow chart showing a process for preparing an activating material of the present invention.

This activating material will now be described with reference to the flow chart of FIG. 2.

An animal bone-containing activating material is preferably prepared by kneading the above-mentioned animal bone with a binding clay powder and molding the mixture into a predetermined shape. A zeolite powder or other clay powder having a size of about 200 to about 500 mesh, which is preferably prepared by firing an inorganic magnetic clay at about 600° C. for about 3 hours and powdering the fired clay is used. An example of a magnetic clay may be a clay with titaniferous or ferruginous components such as crude kaolin clay or the like.

More specifically, a mixture comprising about 60 to 90% by weight of the bone powder and about 10 to about 40% by weight of the clay powder is mixed and kneaded with about 20 to about 30% by weight of water to form a homogeneous composition, and the composition is molded into a spherical shape having a diameter of about 1 to about 20 mm, a plate or rod having a thickness of about 5 to about 10 mm and a side of about 50 mm or other appropriate having a similar size, whereby an animal bone-containing activating material is obtained.

From the practical viewpoint, an activating material having the above-mentioned size is easy to handle, but the size is not limited to a size within the above-mentioned range.

The animal bone-containing activating material is preferably dried in the shade appropriately for 2 to 8 days (for a short time in summer or for a long time in winter) or dried by irradiation with far-infrared rays for an appropriate time to prevent cracking, and the dried material is calcined at about 800° to about 1000° C. for about 1 to about 2 hours so that the water content is below several %, preferably to almost 0%. The calcined material is allowed to stand still and is taken out after an appropriate time of 2 to 6 hours determined according to the calcination temperature and size, and the material is preferably stored in a state wrapped with an air-impermeable bag or in a frozen state and is appropriately taken out and used.

It is believed that rapid cooling after the calcination causes adsorption of water in the dried bone and reduction of the pH value (acidification), and therefore, this rapid cooling is not preferred. Furthermore, in view of prevention of cracking, this rapid cooling is not preferred.

In the case where relatively strong binding is necessary, the clay powder is incorporated in a relatively large amount in the animal bone-containing activating material, and in the case where strong adsorption or alkalization is necessary, the bone powder is incorporated in a relatively large amount, and the mixing ratio is thus changed appropriately according to the intended use. The size can also be appropriately adjusted according to the intended use. For example, in the case where the material is used for filtration, the clay powder is used in a relatively large amount and the material is molded into a relative size of about 1 to about 5 mm, and if the material is used for maintaining the freshness by preventing oxidation of foods and preventing deterioration of oils, the amount of the bone powder is increased and the material is molded in a relatively large size of about 5 cm or more.

When the activating material of the present invention is immersed in cold water (ordinary service water), bubbling is caused and the pH value of water is 7.5 to 10. This pH value depends on the mixing ratio of the bone powder and the size of the activating material.

The above-mentioned activating material effects ion exchange in an atmosphere such as a liquid or air and changes an acid state to a neutral or alkaline state in the atmosphere. Furthermore, the activating material substantially prevents putrefaction of an organic substance or adsorbs or coagulates an organic substance to prevent acidification of a liquid or air and maintain the freshness. Theoretically, these functional effects last long, so far as the bone material is present.

Moreover, if a liquid or air is passed through a layer of the activating material, filtration and purification can be attained by the adsorbing action of the activating material.

EXPERIMENT 1

Four pieces of an activating material comprising 80% by weight of a bovine bone powder and 20% by weight of a zeolite powder, each piece having a diameter of 10 mm and a weight of 6 g, were thrown into 2 liters of a frying oil, and this frying oil was used for business for 22 days by a lunch provider (this oil is designated as oil B). Separately, the same frying oil in which the activating material was not incorporated was similarly used for business for 22 days by a lunch provider (this oil is designated as oil A). These oils were subjected to the deterioration test. The above-mentioned oil B was passed through a filtration layer composed of 500 g of bovine bone particles comprising 100% of a bovine bone and having a square shape having a side of several mm, which were prepared according to the process of the present invention, and the filtered oil (this oil is designated as oil C) was similarly subjected to the deterioration test. The obtained results are shown in Table 2.

Incidentally, the test was carried out according to the method of the Japanese Association of Food Sanitation, and throwing of the activating material in the oil was carried out by using a can having many holes formed on the periphery thereof.

TABLE 2

|  | Acid Value | Calcium Content |
|---|---|---|
| Oil A | 1.4 | 0 mg/100 g |
| Oil B | 1.0 | 0.8 mg/100 g |
| Oil C | 0.3 | 0.8 mg/100 g |

The acid value was determined according to the standard oil or fat analyzing test method and the calcium content was determined according to the atomic absorption spectroscopy. For reference, the acid value of the fresh oil was 0.1 to 0.2.

At the flavor test of fried foods formed by using the foregoing oils, it was found that the coating fried by the oil B or C was much crisper, plainer and nicer than the coating fried by the oil A and the difference was conspicuous.

In view of the reactivity of the bone material, the flowability and the filtration efficiency, an oil temperature of about 50° to about 100° C. was preferred.

As is apparent from the foregoing explanation, if the activating material of the present invention is incorporated into an oil, organic substances included in the oil, such as gravy, sugar and fat, are adsorbed and coagulated to prevent acidification of the oil, and the deterioration of the oil is prevented by the alkalizing action. Moreover, if an oil is passed through a filtration layer composed of the activating material of the present invention, impurities and coagulated organic substances can be removed by filtration and the quality is restored to a level close to that of the fresh oil and an effect of maintaining the freshness can be attained. Simultaneously, an effect of adding a bone-constituting material such as calcium to an oil and a fried food can be attained.

(3) Animal Bone-Containing Flocculating Agent

Figure 3:
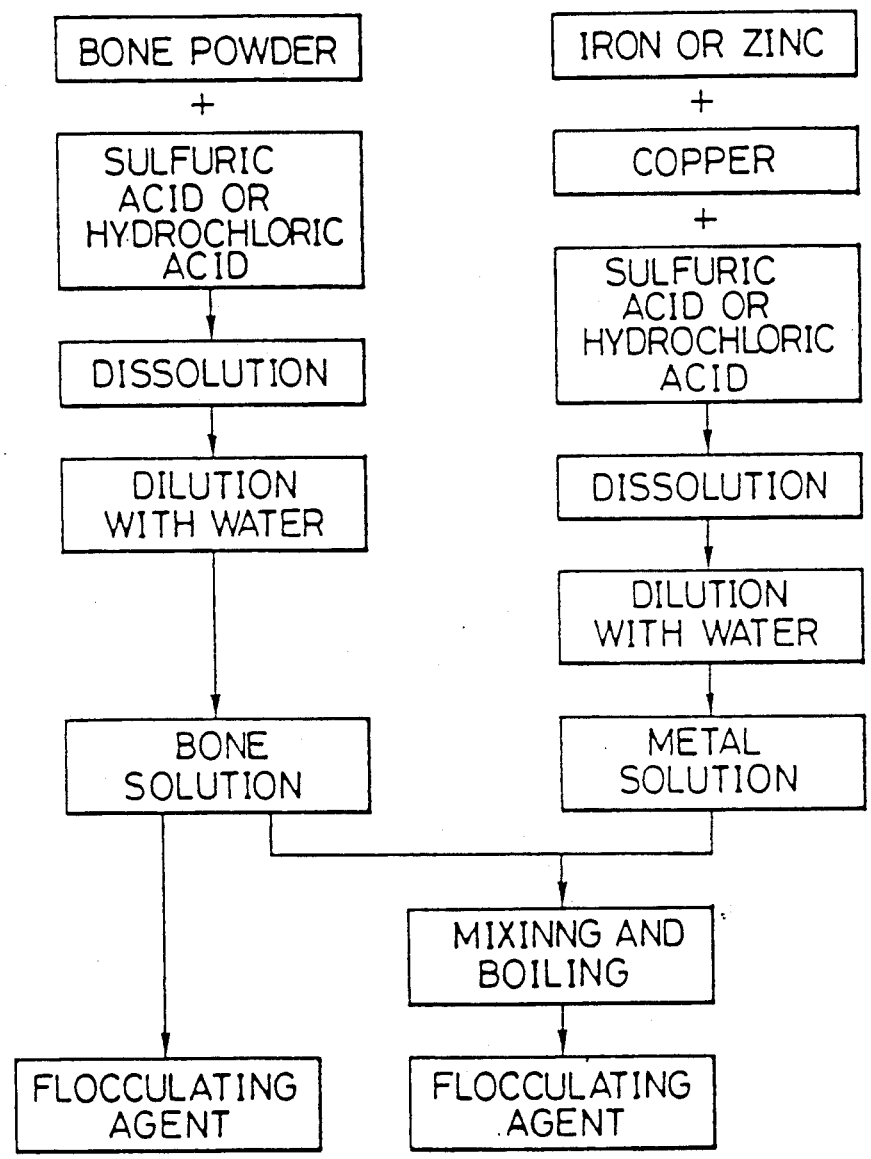
FIG. 3 is a flow chart showing a process for preparing a flocculating agent of the present invention.

Referring to the flow chart of FIG. 3, the above-mentioned animal bone powder is mixed with sulfuric acid (having a concentration of from about 60% to about 95% and preferably about 70% to about 75%). In an experiment performed, the amount of the animal bone powder was about 1 kg per about 1 to about 1.5 liters of the acid having a concentration of about 95%, and the bone powder was dissolved over a period of about 2 hours (or longer). Water was added to the solution in an amount about 8 to about 12 times (by volume) the amount of sulfuric acid to dilute the solution, and the dilution was filtered to form a bone solution A.

Hydrochloric acid (preferably having about the same concentration as the sulfuric acid) may be used instead of sulfuric acid, but in the case where the bone solution is mixed with a metal solution described hereinafter, sulfuric acid is preferable from the viewpoint of the metal-dissolving capacity. All the concentrations of the acids described in this patent application are preferably in the ranges of concentration as disclosed above.

Separately, a mixture comprising 30 to 60 g of iron and 40 to 70 g of copper is mixed with about 1 to about 1.5 liters of sulfuric acid, and iron and copper are dissolved over a period of about 24 hours (or longer). The solution is diluted with water in an amount of about 8 to about 12 times (by volume) the amount of the solution, and the solution is filtered to form a metal solution B.

Incidentally, iron and copper have a reactivity with organic substances and promote coagulation and solidification, and iron and copper exert a function of facilitating sedimentation of the coagulated solids by imparting a weight thereto. Copper exerts a higher effect but from the economical viewpoint, it is preferred that iron be incorporated in copper.

The bone solution A is mixed with the metal solution B at a mixing volume ratio of from 1/about 0.3 to 1/about 0.7, and in order to form a homogeneous composition, the mixture is boiled at 80° to 120° C., preferably about 100° C., for about 30 to about 60 minutes. The composition is then filtered to form an animal bone-containing flocculating agent of the present invention.

The mixture of iron and copper is mentioned as the metal mixture in the foregoing description, but the intended effects can be similarly attained by combining copper with zinc. Both the metal mixtures exert a prominent effect of coagulating organic substances, but a high transparency is maintained in water treated with the mixture of copper and zinc. A mixture of zinc and copper is prominently effective for purification of washing waste water containing a surface active agent, perchloroethylene and a sulfuric acid ester.

Since the bone material which is the main ingredient of the flocculating agent has an alkali-ionizing action, the animal bone-containing flocculating agent of the present invention reacts effectively in the neutral or alkaline region, irrespectively of the origin of the bone. In the case where the pH value of waste water is in the acidic region, in order to change the pH value to the neutral or alkaline region (7.0 to 9.5, preferably 7.0 to 8.5), it is preferred that the flocculating agent be used in combination with an alkaline reactant such as caustic soda or slaked lime so that the volume ratio of the alkaline reactant to the flocculating agent is about 0.3 to about 0.7. Incidentally, if the pH value is higher than 9.5, an acidic reactant such as diluted sulfuric acid is used. In case of life waste water, since sodium chloride, calcium and the like are contained in considerable amounts, the reaction is promoted even if a reactant such as mentioned above is not added.

(4) Waste Water Treatment Using Animal Bone-Containing Flocculating Agent

Examples of the method and apparatus for the waste water treatment using the animal bone-containing flocculating agent of the present invention will now be described with reference to the accompanying drawings.

Figure 4:
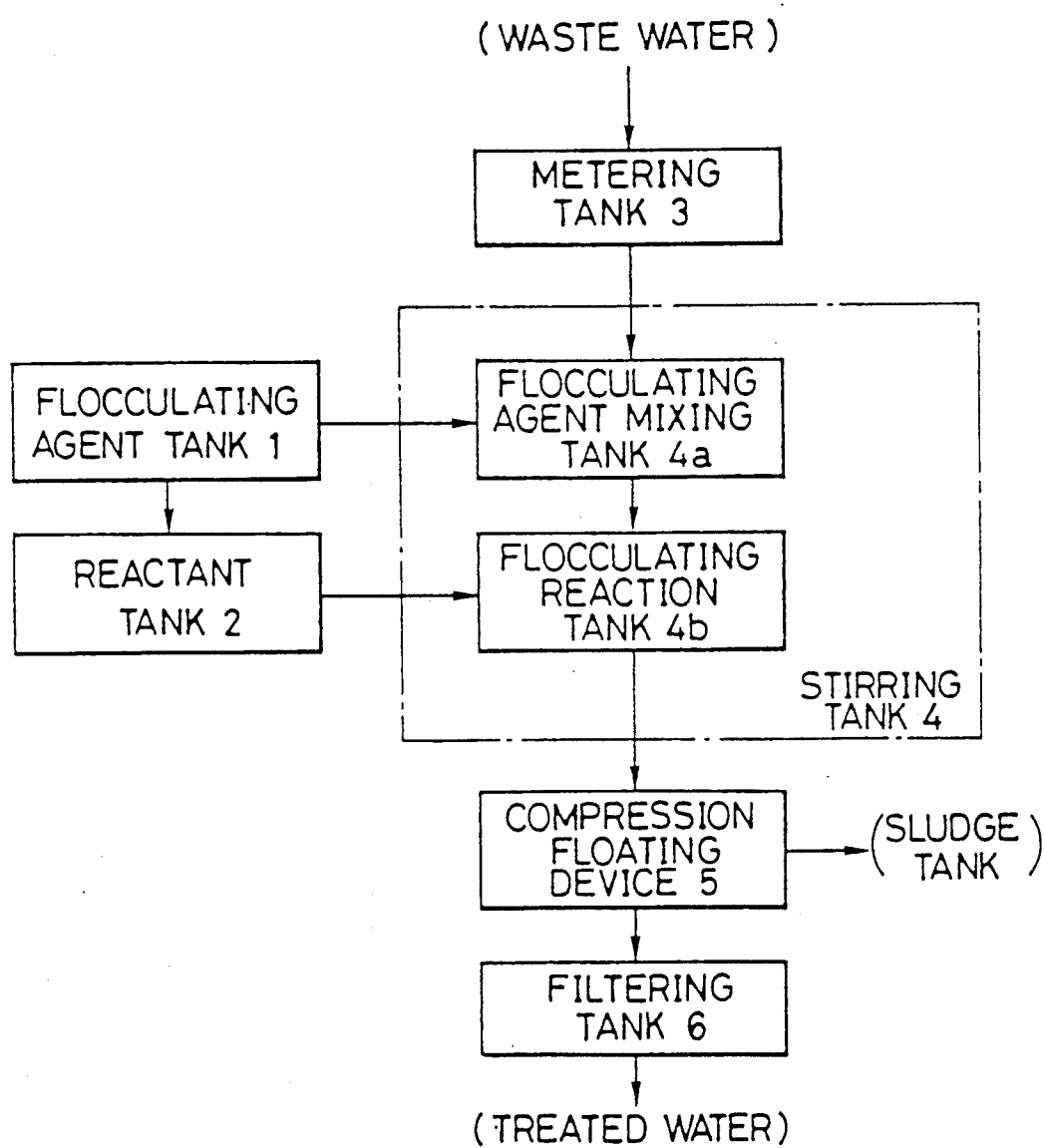
FIG. 4 is a flow chart showing an example of a simple waste water treatment using a flocculating agent of the present invention.

FIG. 4 is a flow chart of a process suitable for the treatment of ordinary life waste water discharged from an ordinary household or ordinary plant.

The apparatus comprises an animal bone-containing flocculating agent tank 1 and a reactant (caustic soda, slaked lime or the like) tank 2, and waste water is first poured into a metering tank 3 for adjusting amounts of the flocculating agent and reactant to be added. Then, waste water is introduced into a stirring tank 4 and the animal bone-containing flocculating agent is added to waste water. Waste water is then sufficiently stirred by a stirrer and the reactant is added to waste water, followed by sufficient stirring. Then, waste water is fed to a compression floating tank 5 and organic substances are flocculated and floated by a compressing action of a compressor. The stirring tank 4 may be divided into a flocculating agent mixing tank 4a equipped with a stirrer and a flocculating reaction tank 4b equipped with a stirrer.

Treated water which has passed through a skimmer arranged above the compression floating tank 5 is introduced into a filtering tank 6. The flocculated solids compressed and floated within the compression floating tank 5 are separated by the skimmer and sucked in a sludge tank, and they are deposited as the sludge.

The filtering tank 6 may be a layer of fine sand or a layer of an animal bone-containing granular body prepared by chipping or powdering an animal bone calcined according to the process of the present invention, kneading the chip or powder with a clay powder, granulating the mixture and calcining the granulated mixture. Since the former filtering layer can remove fine impurities left after removal of organic substances, the filtering layer can cope sufficiently with the treatment of ordinary waste water. The latter filtering layer can perform alkalization and mineralization of treated water by the alkali ionization of the bone in addition to removal of the above-mentioned impurities, and therefore, the filtering layer is especially effective for the treatment of waste water having a relatively high degree of contamination with organic substances.

The above-mentioned treated water is tasteless and odorless, and even if the treated water is directly discharged, there is no risk of environmental pollution and the treated water can be sufficiently utilized again as washing water for a plant or the like. Furthermore, if there is adopted a system for forcibly returning the treated water into the filtering tank through a different pipe, automatic washing of the filtering tank becomes possible.

Figure 5:
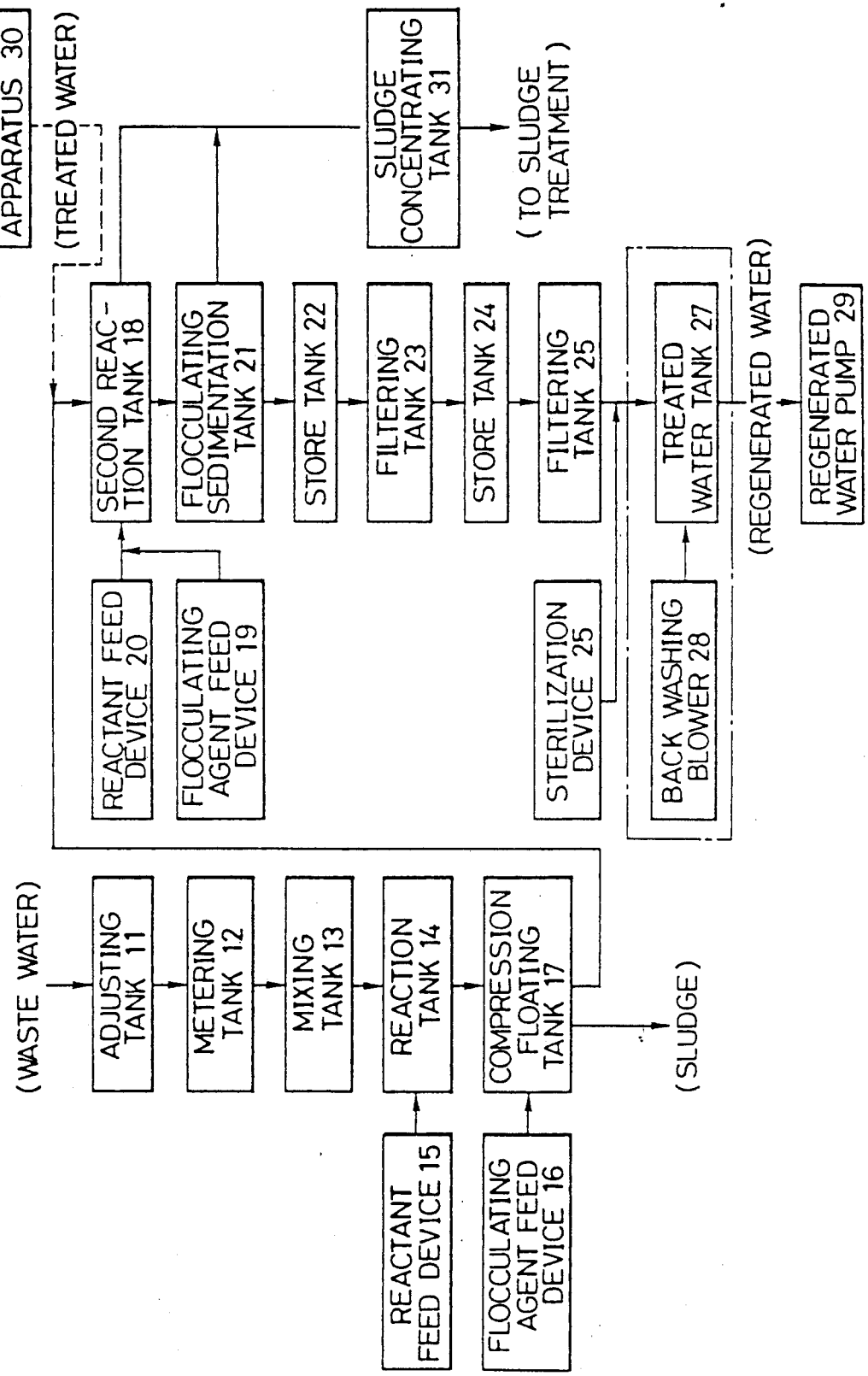
FIG. 5 is a flow chart showing an example of a full-scale apparatus for the waste water treatment using a flocculating agent of the present invention.

FIG. 5 is a flow chart showing a process suitable for the treatment of waste water containing easily corruptible organic substances and having a high contamination degree, such as waste water discharged from a butchery, a livestock product processing plant or the like or foul water.

Waste water discharged directly from a butchery or the like is introduced into an adjusting tank 11 through an automatic screen, and among solids, impurities having a relatively large particle size are removed, and the remaining liquid (hereinafter referred to as "waste water") is stored. The waste water is passed through a metering tank 12 for adjusting the flow amount or flow rate per unit time to a level suitable for the treatment, and the waste water is introduced into a mixing tank 13 and then into a reaction tank 14. Stirring vanes are arranged in both of the tanks, and a reactant feed device 15 for feeding a reactant such as caustic soda or slaked lime and a flocculating agent feed device 16 for feeding the animal bone-flocculating agent of the present invention are connected to these tanks. The reactant is fed so that the pH value of the waste water is 7.0 to 9.5, and the flocculating agent is fed in a very small amount based on the concentration (measured based on the biochemical oxygen demand BOD). For example, about 25 cc of the animal bone-containing flocculating agent is added to 1 m of waste water having BOD of about 800, and the flocculating agent is mixed into the waste water with stirring for about 1 to about 5 minutes in sequence.

It is preferred that the waste water be made homogeneous by aeration (stirring) prior to incorporation of the reactant and flocculating agent. This aeration also is preferred in the case where the flocculating agent is added at a subsequent step.

The waste water is introduced into a compression floating tank 17 from the lower portion under compression by a compressor, and flocculated solids floated by compression are separated by a skimmer arranged above and the liquid is introduced into a second reaction tank 18 while the flocculated solids floated above and separated by the skimmer are discharged into a sludge concentrating tank 31.

The animal bone-containing flocculating agent and the reactant for adjusting the pH value are fed in necessary amounts into the second reaction tank 18 from a flocculating agent feed device 19 and a reactant feed device 20, and stirring reaction is carried out and the liquid is fed to a flocculating sedimentation tank 21 where residual organic substances that could not be removed at the compression floating tank 17 are coagulated and sedimented. The coagulated solids are discharged into the sludge concentrating tank 31. The treated water is passed through a filter and stored in a store tank 24 for a while, and the treated liquid is delivered at a constant flow rate through a longitudinal filtering tank 23 comprising a layer of sand as the filtering material. After natural flowing through the filtering tank 23, the treated water is stored in a store tank 24. Reference numeral 25 represents a longitudinal filtering tank comprising a layer of an animal bone-containing granular body formed by kneading a chip of an animal bone calcined according to the process of the present invention or a powder obtained by powdering the above-mentioned animal bone with a clay powder obtained by calcining and powdering a clay as the binder and granulating the mixture. The treated water stored in the store tank 24 is delivered at a constant rate to the filtering tank 25 and naturally flows through the filtering tank 25, and $ClO_2$ is incorporated into the treated water from a sterilizing device 26 and the sterilized treated water is stored in a treated water tank 27. Each of the filtering tanks 23 and 25 is disposed to remove residual fine impurities, and the filtering tank 25 also has a function of alkali-ionizing the treated water to mineral water by the bone ingredients such as calcium.

If a back washing blower 28 is connected to the treated water tank 27 through a pipe and there is disposed a system for forcibly returning the treated water into both the filtering tanks 23 and 25 and washing the filtering tanks, the capacities of the filtering tanks can be maintained for a long time. Furthermore, if a regenerated water pump 29 is connected to the treated water tank 27, the treated water can be utilized again as washing water for a butchery or the like. Of course, even if the treated water is directly discharged, there is no risk of environmental pollution.

In the case where the apparatus of the present invention is combined with a waste water disposal equipment according to the conventional activated sludge process or the like, treated water discharged from a final sedimentation tank of the conventional apparatus 30 is introduced into a second reaction tank 18 and is then treated according to the above-mentioned procedures.

The sludge accumulated in the sludge concentrating tank 31 is concentrated, appropriately dried through a sludge treating step and appropriately discarded or naturally fermented after a granulating step. Thus, the sludge can be utilized as a fertilizer or soil improver. Since the sludge is composed of deposited organic materials, the sludge exerts an excellent effect as a natural fertilizer or soil improver.

EXPERIMENT 2

Untreated waste water (hereinafter referred to as starting water) A discharged from a meat center (butchery) located at Kumamoto Prefecture, Japan, treated water B formed by treating the starting water by an ordinary activated sludge treatment apparatus being operated at this meat center, and treated water C formed by treating the starting water through the process of the present invention shown in FIG. 5 were analyzed at the Drug and Chemical Inspection Center of the Kumamoto Pharmaceutist Association. The obtained results are shown in Table 3.

TABLE 3

| Analysis Item | Sample A | Sample B | Sample C |
|---|---|---|---|
| pH | 6.7(27.0° C.) | 7.6(26.0° C.) | 6.8(25.0° C.) |
| SS(mg/l) | $1.0 \times 10^3$ | 80 | 1 |
| COD(mg/l) | $7.2 \times 10^2$ | 62 | 6.0 |
| BOD(mg/l) | $1.6 \times 10^5$ | 39 | 1.1 |
| Number of E. coli (cells per cm³) | $1.7 \times 10^5$ | $7.1 \times 10^3$ | 0 |
| n-Hexane extracted substances | 71 | not tested | 1.6 |

BOD represents the biochemical oxygen demand, COD represents the chemical oxygen demand, and SS represents the suspended substance. The pH value was determined according to Standard 2.1, SS was determined according to Official Notice No. 59 of the Environment Agency, COD was determined according to Standard 17, BOD was determined according to Standard 21, the number of E. coli was determined according to Construction Ordinance No. 1 of the Welfare Ministry, and the n-hexane extracted substance was determined according to the Table of Official Notice No. 64 of the Environment Agency. The Standard was JIS K-0102.

EXPERIMENT 3

Starting water A discharged from a meat processing factory (butchery) located at Kagoshima Prefecture, Japan, and treated water C formed by treating the starting water C through the process of the present invention shown in FIG. 5 were analyzed at the Kagoshima Pollution Prevention Association. The obtained results are shown in Table 4.

TABLE 4

| Analysis Item | Sample A | Sample C |
|---|---|---|
| pH | 6.0 | 8.4 |
| SS(mg/l) | 3610 | lower than 5.0 |
| COD(mg/l) | 470 | 7.9 |
| BOD(mg/l) | 1870 | 15.5 |
| Number of E. coli (cells/ml) | $7.0 \times 10^5$ | 0 |
| n-Hexane extracted substance (mg/l) | 1620 | lower than 2.5 |

The analysis methods adopted were the same as those adopted in Experiment 2.

EXPERIMENT 4

Starting water A discharged from a meat center (butchery) located at Kitakyushu City, Japan, treated water B formed by treating the starting water A by an ordinary activated sludge treatment apparatus being operated at this meat center, and treated water C formed by treating the starting water A through the process of the present invention shown in FIG. 5, were analyzed by the Kitakyushu Environment Maintenance Association. The obtained results are shown in Table 5.

TABLE 5

| Analysis Item | Sample A | Sample B | Sample C |
|---|---|---|---|
| SS(mg/l) | 253 | 108 | lower than 1 |
| COD(mg/l) | 6400 | 120 | 7 |
| BOD(mg/l) | 9800 | 50 | 4 |
| Number of E. coli (cells/cm³) | $5.6 \times 10^5$ | $5.2 \times 10^3$ | 0 |

Other data were substantially the same as those obtained in Experiment 2. The measurement methods were the same as those adopted in Experiment 2.

EXPERIMENT 5

Starting water A discharged from a meat processing plant (butchery) located at Fukuoka Prefecture, Japan, and treated water C formed by treating the starting water A through the process of the present invention shown in FIG. 5, were analyzed at the Japanese Environmental Sanitation Center Incorporation. The obtained results are shown in Table 6.

TABLE 6

| Analysis Item | Sample A | Sample C |
| --- | --- | --- |
| pH | 7.1 (25.0° C.) | 6.6 (25.0° C.) |
| SS(mg/l) | 450 | lower than 1 |
| COD(mg/l) | 420 | 5.8 |
| BOD(mg/l) | 800 | 6 |
| Number of E. coli (cells/ml) | above $160 \times 10^5$ | 0 |

The number of E. coli was determined according to the MPN method, and other measurement methods were the same as those adopted in Experiment 2.

EXPERIMENT 6

Starting water A discharged from a broiler processing company located at Miyazaki Prefecture, Japan, treated water B formed by treating the starting water A by an ordinary activated sludge treatment apparatus being operated at this company, and treatment apparatus being operated at this company, and treated water C formed by treating the starting water A through the process of the present invention shown in FIG. 5, were analyzed at the Miyazaki Pollution Preventing Association. The obtained results are shown in Table 7.

TABLE 7

| Analysis Item | Sample A | Sample B | Sample C |
| --- | --- | --- | --- |
| pH | 6.5(27.0° C.) | 6.9(27.0° C.) | 7.2(27.0° C.) |
| SS(mg/l) | 870 | 84 | 1.2 |
| COD(mg/l) | 510 | 35 | 2.8 |
| BOD(mg/l) | 1700 | 56 | 3.0 |
| Number of E. coli (cells/cm$^3$) | $6.6 \times 10^6$ | $1.3 \times 10^4$ | 0 |
| n-Hexane extracted substance(mg/l) | 56 | below 0.5 | below 0.5 |

EXPERIMENT 7

Treated water C was obtained by treating starting water A discharged from a seasoned pollack spawn making plant through the process of the present invention shown in FIG. 5 by using a solution of zinc and copper as the metal solution of the flocculating agent instead of the solution of iron and copper. The starting water A and treated water C were analyzed at the Kyushu Environment Maintenance Association. The obtained results are shown in Table 8. Incidentally, the measurements were conducted according to JIS K-0102.

TABLE 8

| Analysis Item | Sample A | Sample C |
| --- | --- | --- |
| BOD(mg/l) | 12200 | 886 |
| COD(mg/l) | 2110 | 185 |
| SS(mg/l) | 5400 | 2 |

EXPERIMENT 8

Treated water C was obtained by treating starting water A from a laundry for dry-cleaning household carpets, clothes and the like in the same manner as described in Experiment 7 by using the flocculating agent comprising the solution of zinc and copper as the metal solution. The starting water A and treated water C were analyzed at the Ariake Environment Maintenance Association. The obtained results are shown in Table 9.

TABLE 9

| Analysis Item | Sample A | Sample C |
| --- | --- | --- |
| BOD(mg/l) | 231 | 18 |
| COD(mg/l) | 107 | 14 |
| SS(mg/l) | 53 | 4.3 |

Incidentally, BOD was determined according to the membrane electrode method of Standard 21, COD was determined according to the titration method of Standard 17, and SS was determined according to the method shown in the Table of Official Notice No. 59 of the Environment Agency.

EXPERIMENT 9

Treated water B formed by treating starting water discharged from a laundry for dry-cleaning business carpets, business bed-quilts, business towels and the like by a treatment apparatus annexed to the laundry by using a conventional flocculating agent comprising ferric chloride, alumina sulfate and the like, and treated water C formed by treating the treated water B through the above-mentioned process of the present invention by using the flocculating agent of the present invention (comprising the above-mentioned solution of zinc and copper as the metal solution), were analyzed by Kure Kiko K. K. The obtained results are shown in Table 10. The measurements were conducted according to JIS · K-0102.

TABLE 10

| Analysis Item | Sample B | Sample C |
| --- | --- | --- |
| pH(25° C.) | 6.99 | 6.18 |
| BOD(mg/l) | 43.4 | 20.8 |
| COD(mg/l) | 55.1 | 13.1 |
| SS(mg/l) | 72.3 | 3.8 |

EXPERIMENT 10

According to the conventional procedures, service water had been sterilized by sodium hypochlorite, BOD and COD had been reduced by alumina sulfate, and SS had been reduced by active carbon. When the flocculating agent of the present invention was added to starting water for this service water (about 20 cc per m$^3$ of starting water), coagulation of organic substances was conspicuous, and the values of the respective analysis items were reduced to levels of 1/scores to 1/several hundreds of the values of purified water obtained according to the conventional procedures, and reduction of COD was especially conspicuous. Furthermore, when the flocculating agent of the present invention was added to purified water according to the conventional procedures, coagulation of organic substances and the like could be observed with the naked eye.

In each of the foregoing experiments, sample A had a strong fishy or foul smell and sample B had a weak putrefaction smell, but sample C had no substantial smell and was colorless and transparent.

Sample C was highly regenerated by a high purifying action so that it could be used as drinking water. When sample C was drunk by 20 men, it was confirmed that sample A tasted lighter and sweeter than service water and the taste was similar to that of so-called mineral water.

As is apparent from the foregoing description, when water regenerated by the apparatus according to the present invention is used as industrial water, washing water and the like, if used water is purified by the apparatus again, regenerated water can be used repeatedly, and a water resource-saving effect can be attained.

Incidentally, since the coagulated solids separated by the above-mentioned treatments are organic substances, if they are subjected to an appropriate treatment, they can be utilized as fertilizers or composts.

All the documents, patent publications and standards are incorporated herein by reference as if they were set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. A method of preserving food comprising the steps of:
    calcining animal bone to have a water content of less than about 6 percent by weight;
    beneficiating said calcined animal bone to a size between about 20 mesh to about 200 mesh; and
    disposing the beneficiated calcined animal bone at least adjacent to food to be preserves.

2. The method of preserving food according to claim 1, wherein said calcining animal bone comprises calcining animal bone from at least one of the following animals:
    at least one bovine animal,
    at least one equine animal, and
    at least one sheep.

3. The method of preserving food according to claim 2, further including:
    mixing the calcined animal bone with at least one of: a zeolite powder and a clay powder to form a mixture, the clay powder comprising a calcined powder of at least one clay having magnetic properties, the at least one clay having magnetic properties comprising at least one Kaolin clay;
    shaping the mixture to a desired size and shape; and
    further calcining the shaped mixture.

4. A method of purifying fluid comprising the steps of:
    calcining animal bone to have a water content of less than about 6 percent by weight;
    beneficiating said calcined animal bone to a size between about 20 mesh to about 200 mesh; and
    disposing the beneficiated calcined animal bone in a fluid to be purified.

5. The method of purifying fluid according to claim 4, wherein said calcining animal bone comprises calcining bone from at least one of the following animals:
    at least one bovine animal, at least one equine animal, and at least one sheep.

6. The method of purifying fluid according to claim 5, further including:
    mixing the calcined animal bone with at least one of: a zeolite powder and a clay powder to form a mixture, the clay powder comprising a calcined powder of at least one clay having magnetic properties, the at least one clay having magnetic properties comprising at least one Kaolin clay;
    shaping the mixture to a desired size and shape; and
    further calcining the shaped mixture.

7. A method for removing odor from an odorous material, said method comprising:
    calcining animal bone to have a water content of less than about 6 percent by weight;
    beneficiating said calcined animal bone to a size between about 20 mesh to about 200 mesh; and
    disposing the beneficiated calcined animal bone at least adjacent an odorous material to be de-odorized.

8. The method for removing odor according to claim 1, wherein said calcining animal bone comprises calcining animal bone from at least one of the following animals:
    at least one bovine animal,
    at least one equine animal, and
    at least one sheep.

9. The method for removing odor according to claim 8, further including:
    mixing the calcined animal bone with at least one of: a zeolite powder and a clay powder to form a mixture, the clay powder comprising a calcined powder of at least one clay having magnetic properties, the at least one clay having magnetic properties comprising at least one Kaolin clay;
    shaping the mixture to a predetermined size and shape; and
    further calcining the shaped mixture.

10. A method for treating liquids containing contaminants, said method comprising the steps of:
    calcining animal bone to have a water content of less than about 6 percent by weight;
    beneficiating said calcined animal bone to a size between about 20 mesh to about 200 mesh;
    dissolving said beneficiated calcined animal bone in a liquid to form a first solution, said liquid comprising at least one acid for dissolving said calcined animal bone;
    dissolving at least one metal in a liquid to form a second solution, said at least one metal comprising at least one of: copper, iron, and zinc, said liquid comprising at least one acid for dissolving said at least one metal;
    mixing said first solution with said second solution to form a flocculating agent; and
    placing the flocculating agent in the liquid to be treated to thereby flocculate the contaminants of the liquid.

11. The method according to claim 10, wherein:
    said dissolving said calcined animal bone in at least one acid comprises dissolving said calcined animal bone in at least one acid of the group consisting of: hydrochloric acid and sulfuric acid;
    said dissolving at least one metal in at least one acid comprise dissolving at least one metal of the group consisting of: copper, iron, and zinc in said at least one acid; and
    said dissolving said at least one metal in at least one acid comprises dissolving said at least one metal in at least one member of the group consisting of: hydrochloric acid an sulfuric acid.

12. The method according to claim 11, wherein said calcining animal bone comprises calcining bone from animals having hard bones, said animals having hard bones including at least the following animals: bovine animals, equine animals, and sheep.

13. The method according to claim 12, wherein the acid has a concentration in the range of about 60 percent to about 95 percent;
    said dissolving said calcined animal bone in a liquid to form the first solution comprises dissolving calcined animal bone in the acid in a ratio of about 1 kilogram calcined animal bone to about 1 liter to about 1.5 liters of acid:

said dissolving said metal in a liquid to form the second solution comprises dissolving metal in the acid in a ratio of about 100 grams of metal to about 1 liter to about 1.5 liters of acid, and the about 100 grams of metal comprises about 40 grams to about 70 grams of copper and about 30 grams to about 60 grams of at least one of iron and zinc.

14. The method according to claim 13, wherein said mixing the first solution with the second solution to form the flocculating agent comprises mixing the first solution and a second solution in a ratio of about 1 liter of the first solution to about 0.3 liters to about 0.7 liters of the second solution.

15. The method according to claim 14, further comprising separately diluting both the first solution and the second solution with water by about 8 times to about 12 times the volume of each solution before the first solution and the second solution are mixed together.

16. A process for alkali-ionizing an atmosphere with an animal bone activating material, which process comprises:

boiling crude animal bone cut to a predetermined size at a temperature of about 200° Celsius to about 400° Celsius to remove a substantial portion of organic components of the crude animal bone;

calcining the boiled bone for about 80 minutes to about 180 minutes at a temperature of about 900° Celsius to about 1100° Celsius to reduce the water content of the bone to less than about 6 weight percent;

cooling the bone to about ambient temperature; and beneficiating the calcined bone to a size between about 20 mesh to about 200 mesh; and disposing the beneficiated bone at least adjacent an atmosphere to be alkali-ionized.

17. The process for preparing an activating material according to claim 16, wherein said calcining the boiled animal bone comprises calcining bone from at least one of the following animals:

at least one bovine animal, at least one equine animal, and at least one sheep.

18. The process for preparing an activating material according to claim 17, further including:

mixing the calcined animal bone with at least one of a zeolite powder and a clay powder to form a mixture, the clay powder comprising a calcined powder of at least one clay having magnetic properties, the at least one clay having magnetic properties comprising at least one Kaolin clay;

shaping the mixture into a desired size and shape; and further calcining the shaped mixture.

19. A method of treating a liquid containing contaminants with a flocculating agent containing animal bone, said method comprising the steps of:

a) calcining animal bone to have a water content of less than about 6 percent by weight;

b) beneficiating said calcined animal bone to a size between about 20 mesh to about 200 mesh;

c) dissolving the beneficiated calcined animal bone in a liquid, said liquid comprising essentially at least one member of the group consisting of: sulfuric acid and hydrochloric acid to form a first solution;

d) dissolving copper and at least one of: iron and zinc in a liquid to form a second solution, said liquid comprising essentially at least one member of the group consisting of: hydrochloric acid and sulfuric acid; and e) diluting at least one of: said first solution and said second solution with water;

f) mixing the first solution with said second solution to produce said flocculating agent;

placing said flocculating agent adjacent the liquid to be treated.

20. The method according to claim 19, wherein said calcining animal bone comprises calcining animal bone from at least one of the following animals:

at least one bovine animal, at least one equine animal, and at least one sheep.

21. The method according to claim 20, further including:

mixing the animal bone with at least one of: sulfuric acid and hydrochloric acid, in a ratio of about 1 kilogram of bone to about 1 liter to about 1.5 liters of the acid; and mixing about 40 grams to about 70 grams of the copper with about 30 grams to about 60 grams of at least one of: iron and zinc, and dissolving about 100 grams of the copper and at least one of iron and zinc in about 1 liter to about 1.5 liters of at least one of hydrochloric acid and sulfuric acid.

22. The method according to claim 21, further including separately diluting both the first solution and the second solution with water before combining the first solution with the second solution.

23. The method according to claim 22, wherein said first solution and said second solution have a volume, and said diluting both the first solution and the second solution with water comprises diluting both the first solution and second solution by about 8 times to about 12 times the volume of each.

24. The method according to claim 23, wherein said mixing said first solution and said second solution comprises mixing the first solution and the second solution at a volume ratio in the range of from about 1 to 0.3 to about 1 to 0.7 to form said flocculating agent.

* * * * *

UNITED STATES PATENT AND TRADEMARK OFFICE
CERTIFICATE OF CORRECTION

PATENT NO. : 5,047,255
DATED : September 10, 1991
INVENTOR(S) : Sanai FUJITA It is certified that error appears in the above-identified patent and that said Letters Patent is hereby corrected as shown below:

Col.17 Claim 1, line 8, after 'be', delete "preserves" and insert --preserved--.

Col. 18 Claim 8, line 2, delete "1" and insert --7--.

Col. 18 Claim 9, line 9, after 'a', delete "predetermined" and insert --desired--.

Col 19 Claim 14, line 4, after 'and', delete "a".

Col. 20 Claim 19, line 21, before 'placing', insert --g)--.

Signed and Sealed this

Ninth Day of March, 1993

Attest:

STEPHEN G. KUNIN

*Attesting Officer*   *Acting Commissioner of Patents and Trademarks*